July 31, 1934.   W. W. CRILEY   1,968,129
CLUTCH
Filed Oct. 9, 1931
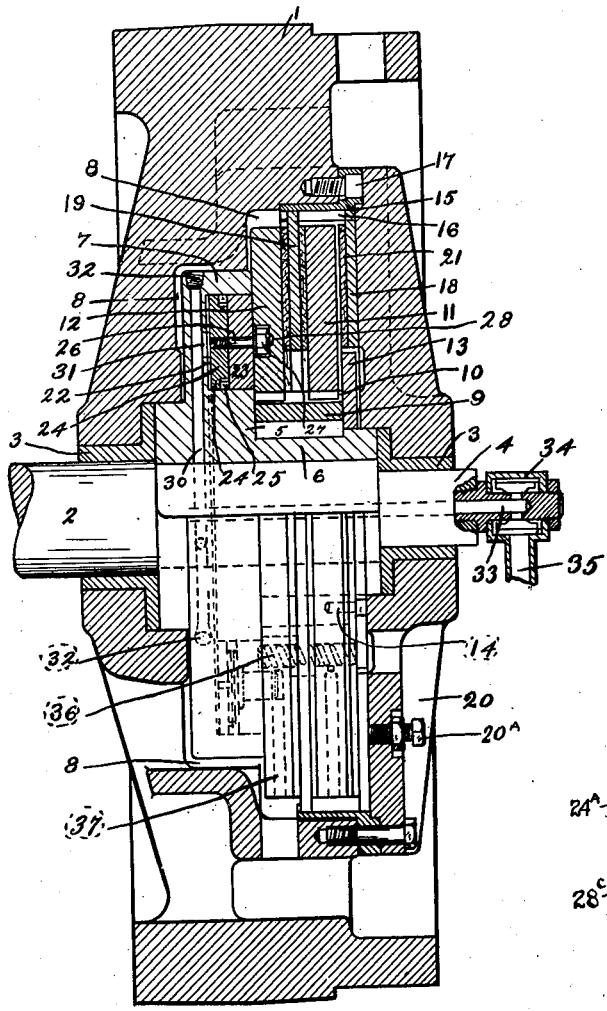
INVENTOR.
William W. Criley
BY
Ray Oberlin & Ray
ATTORNEYS.

Patented July 31, 1934

1,968,129

UNITED STATES PATENT OFFICE 1,968,129

CLUTCH

William W. Criley, Cleveland, Ohio

Application October 9, 1931, Serial No. 567,909

8 Claims. (Cl. 192—85)

This invention relates to power-operated clutches and is particularly directed to clutches suitable for operating forging machines, presses and other heavy machinery. The invention aims to provide a quick-acting clutch of this character of simple and rugged construction and economical of space, in which the clutch hub forms an operating air cylinder, in which a ring shaped piston is simply but accurately secured for rotation with the clutch, and in which the stroke of the piston can be regulated from outside the clutch assembly for taking up wear and for other purposes. Other aims of the invention will be apparent as the description proceeds.

Although the description and drawing are particularly illustrative of a pneumatically actuated clutch, it will be understood that the invention is not limited thereto, and that actuating fluids other than air may be employed. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing Fig. 1 is a central vertical longitudinal section through the clutch assembly, the lower half being somewhat diagrammatic and partly in elevation; Fig. 2 is a fragmentary longitudinal section on a larger scale showing mechanism for keeping the piston from turning in its cylinder; and Fig. 3 is a view similar to Fig. 2 but showing an alternative construction.

In the present illustrative embodiment of a preferred form of the invention, the improved clutch is illustrated as housed within a flywheel from which power is to be applied to the back shaft or pinion shaft of a forging machine or other heavy mechanism, the connection being through the clutch.

Referring now particularly to Fig. 1, the flywheel 1 is mounted on the back shaft 2 by suitable bearings such as 3. In the form here shown the shaft 2 extends entirely through the flywheel as indicated at 4. A hub 5 fast upon the shaft 2 carries the various clutch actuating elements as well as the driven members of the clutch assembly while the flywheel carries the driving elements. The hub is formed with a forward sleeve portion 6 and rear flange portion 7. The flange 7 constitutes one wall of an air cylinder, as described hereafter. In general the hub 5 fits within a recess 8 in the flywheel.

An externally toothed pinion 9 is keyed or otherwise fastened upon the sleeve portion 6 of the hub 5, this ring being toothed as at 10. A series of annular center plates 11, 12, internally toothed, fit upon the teeth 10 of the pinion 9, but are longitudinally movable therealong. This portion of the hub assembly is closed by a locking ring 13 which in turn is held in place by any suitable means such as screws 14. A driving ring 15, internally toothed as at 16, is fastened within the recess 8 of the flywheel 1 by suitable means such as bolts 17. Annular driving plates 18 and 19, externally toothed to fit the teeth 16, are mounted within the driving ring 15, capable of longitudinal movement on the teeth 16. The plate 18 is backed by a cover 20 which closes the recess 8. The usual friction facing 21 is provided between the center plates and the driving plates. Set screws 20$^A$ suitably disposed in the cover 20 bear against the plate 18 for the purpose of taking up wear of the friction elements and thus keeping the clutch operating with the minimum effective piston stroke. It will be noted that the heads and lock nuts of these screws are accessible from outside the cover plate.

The flange 7 of the hub 5, which is the air cylinder of the operating means, has a ring-shaped recess 22, sometimes referred to hereafter as the cylinder, facing the center plate 12 and occupied by a corresponding annular piston 23. In the preferred form here shown the piston assembly includes a follower ring 24 and packing 25, such as a fiber cup or a ring. The piston assembly is held together by studs 26 disposed at desired intervals. Heads 27 and lock washers on the forward ends of these studs are received in recesses 28 in the back center plate 12. Dowel pins 28$^A$ in the piston 23, spaced at 180°, fit into corresponding guide recesses in the back center plate 12 to prevent the piston from revolving in the annular cylinder 22 in which it operates. As shown in Fig. 2, the dowel pins are formed with flanges 28$^B$ seating in the rear face of the piston, and are prevented from backing out by the follower ring 24. Their length is such that the operating withdrawal of the piston does not clear the pins from their guide recesses in the plate 12.

An alternative construction is shown in Fig. 3 in which the piston follower ring, here designated as 24$^A$, carries the dowel pins 28$^C$ which engage corresponding guide recesses in the cylinder flange, here designated as 7$^A$, in all operative positions of the piston, the dowels 28$^C$ being held in place by the piston 23$^A$.

Air is admitted behind the piston by a series of radial ducts 30 each leading into the mid-width of the recess or cylinder 22 by a port 31. For convenience in manufacture, the ducts 30 are bored through the edge of the flange 6 and plugged as at 32. Air, or other fluid under pressure, is led from a suitable source of supply through a valve (not shown) to the ducts 30 by any convenient arrangement. The arrangement shown here comprises an axial passage 33 through the back shaft 2. Air is led to the passage 33 by a stationary hollow collar 34 which surrounds the revolving back shaft and which has an air inlet 35.

Release springs such as 36 supported by the locking ring 13 and bearing against the piston 23 separate the driving plates and center plates by returning the piston 23 when pressure in the cylinder 22 is relieved. Radial cores 37 may be made in the driven plates 11 and 12 for cooling.

In operation the admission of air through the ports 31 moves the piston 23 forward, overcoming the springs 36 and forcing the friction surfaces of the clutch plates into tight contact. Upon release of air pressure the springs 36 return the pistons relieving the contacting friction surfaces of pressure.

It will be seen from the foregoing that I have invented a clutch capable of having the annular space or cylinder wherein the piston moves economically and accurately made, by reason of the fact that the inner wall as well as the outer wall is formed by the clutch hub. My improved clutch is also characterized by a simple, accurate and compact means for preventing relative rotation between the piston and its annular cylinder, and means for readily adjusting the axial spacing between the various plates of the clutch so that the amount of piston travel to engage or release the clutch may always be kept at a minimum. Among the advantages of this last feature is that minimum travel allows quick release, which is essential in order that the machine may be stopped at the correct point on each stroke. Stoppage at the correct point is very important on machines of the sort for which my improved clutch is designed.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A fluid pressure operated friction clutch comprising in combination a driving member and a driven member, a series of frictional plates carried by said driving member and a series of frictional plates carried by said driven member, said series being mutually interdisposed, one of said members including a hub, an annular recess in the face of said hub and an annular piston fitting therein, positive means to prevent said piston from rotating relative to said annular recess, said piston being movable axially to apply pressure between the surfaces of the interdisposed frictional plates and fluid means for applying pressure behind said piston.

2. In a fluid pressure operated clutch, a fluid cylinder, an annular piston movable therein, a clutch plate mounted on an element of said cylinder for axial movement thereon, said plate and said piston being in face contact, projections on the piston face, and depressions in the plate face receiving said projections, said projections and depressions being in circumferential engagement.

3. In a fluid pressure operated clutch, an annular piston, an axially-directed dowel pin seated in said piston, a clutch plate in face contact with said piston, a guide recess in said clutch plate, said dowel pin having a sliding fit in said guide recess.

4. In a fluid pressure operated clutch, an annular piston, a follower attached thereto, a plurality of axially directed dowel pins seated in said piston and backed by said follower, a clutch plate mounted face to face with said piston, guide recesses in said clutch plate slidably receiving each of said dowel pins to a depth greater than the stroke of said piston.

5. In a clutch, a driving member and a driven member, one of which surrounds the other, said surrounding member including an internally toothed ring and said surrounded member including an externally toothed pinion, plates toothed to each of said members at longitudinal spaces and longitudinally movable therealong, alternate ones of said plates being carried by said outward and said inward members respectively, the walls of one of said members defining an annular recess, an axial movable annular piston carried in said annular recess at one end of said series of rings, a cover plate on said surrounding member, set screws operable from outside said cover plate and bearing against the end of said series of rings opposite said piston.

6. In a fluid pressure operated clutch, a shaft, a hub fast thereon including an annular pressure cylinder, a ring piston in said cylinder substantially filling said cylinder when the clutch is disengaged, clutch plates carried by said hub, a clutch housing assembly, clutch plates therein adapted for engagement with the clutch plates on said hub upon the admission of pressure to said cylinder, said shaft passing through said housing assembly, and bearings supporting said assembly on said clutch on opposite sides of said hub.

7. In a fluid pressure operated clutch, in combination, a shaft, a hub fast thereon constituting one member of said clutch, an annular recess defined by surfaces of said hub, said recess forming a pressure cylinder, and an annular piston within said cylinder substantially filling said cylinder when the clutch is disengaged, a second clutch member, interdisposed clutch plates carried respectively by said hub and by said second member, said piston being adapted to bring said plates into engagement, said second member surrounding said hub at circumference and ends, and bearings on said shaft on either side of said hub supporting said second member.

8. In a quick acting heavy duty clutch structure a shaft, a hub fast thereon having a sleeve portion and a flange portion, said flange portion forming a pressure cylinder, an annular piston in said cylinder, said piston filling said cylinder substantially without clearance space when the clutch is disengaged, a clutch plate fast circumferentially to but movable axially upon said sleeve portion, a second clutch element, a clutch plate carried thereby, said piston being adapted to move said first-named clutch plate axially into frictional engagement with said second-named clutch plate, said second member surrounding said hub at circumference and ends, and bearings on said shaft on either side of said hub supporting said second member.

WILLIAM W. CRILEY.